Oct. 1, 1963  D. L. MOORE ETAL  3,105,579
HEAVY DUTY CLUTCH BRAKE
Filed April 14, 1961  3 Sheets-Sheet 1
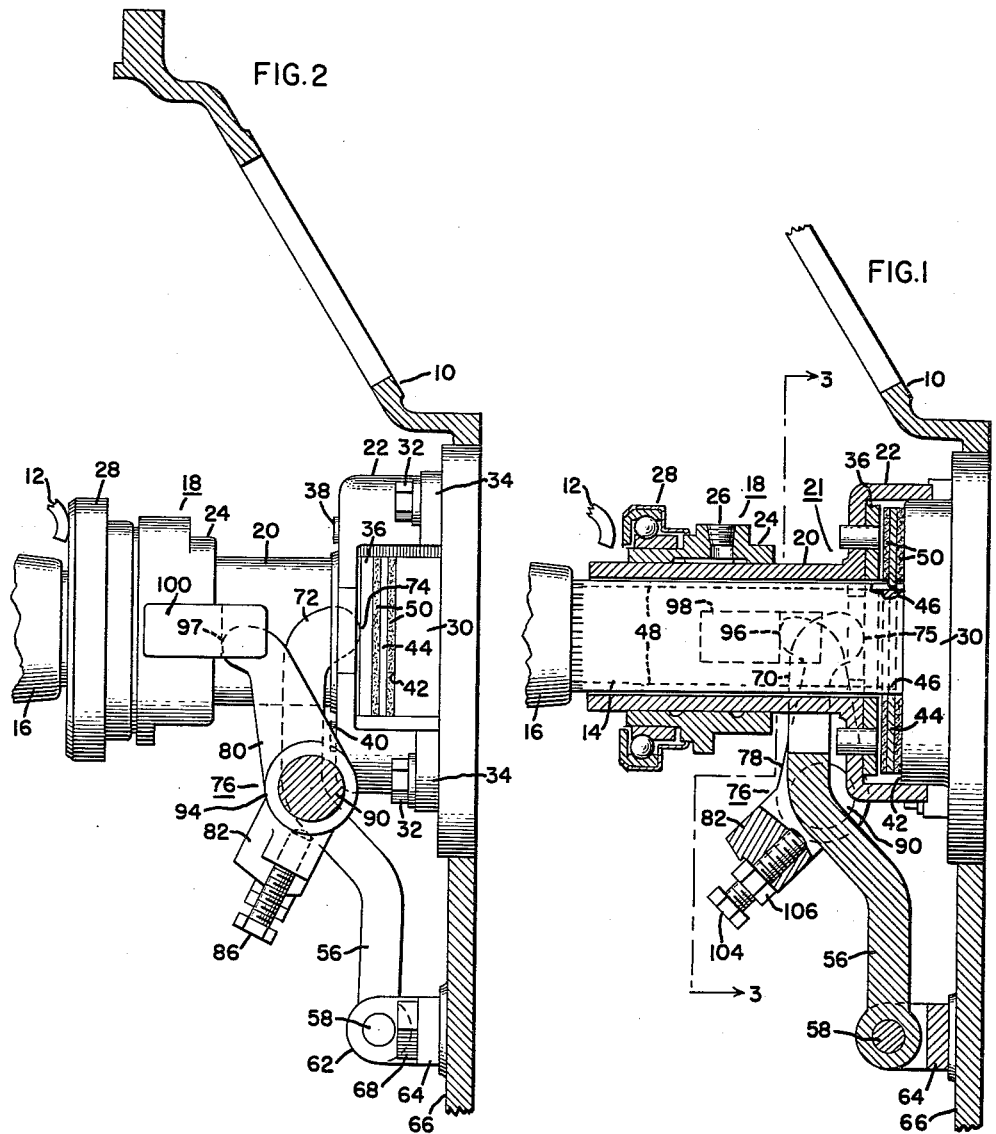
INVENTORS:
DAVID L. MOORE,
JAMES R. CLARK,
BY *D. Emmett Thompson*
THEIR ATTORNEY.

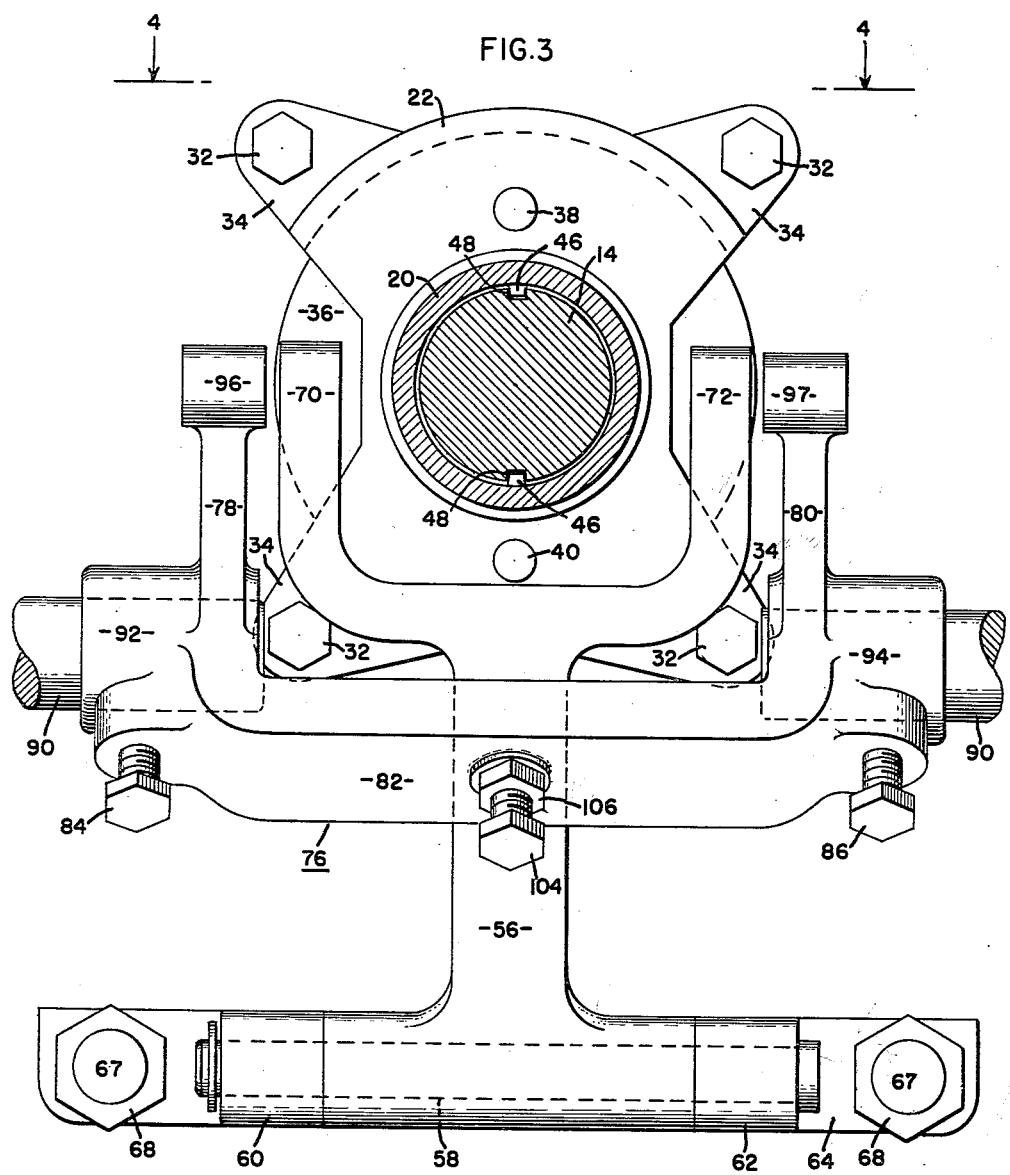

Oct. 1, 1963 D. L. MOORE ETAL 3,105,579
HEAVY DUTY CLUTCH BRAKE
Filed April 14, 1961 3 Sheets-Sheet 3

INVENTORS:
DAVID L. MOORE,
JAMES R. CLARK,
BY D. Emmett Thompson
THEIR ATTORNEY.

3,105,579
HEAVY DUTY CLUTCH BRAKE
David L. Moore, De Witt, and James R. Clark, Syracuse, N.Y., assignors to Lipe-Rollway Corporation, Syracuse, N.Y., a corporation of New York
Filed Apr. 14, 1961, Ser. No. 103,068
2 Claims. (Cl. 192—13)

This invention relates to an inertia brake for a "push" type clutch. Such inertia brakes for push type clutches wherein the braking mechanism is located rearwardly of the clutch mechanism are unusual. This is due to the fact that the motion of the clutch releasing mechanism must be first reversed in order to effect the braking action. Push type clutches, however, have many desirable and advantageous features over conventional "pull" type clutches and hence, it has been found desirable to provide push type clutches with braking arrangements which brake the driven member and rotating members of the transmission connected thereto to a halt in order to facilitate gear engagement and shifting from a gear of high ratio to a gear of lower ratio, commonly known as "up shifting."

Accordingly, it is a general object of this invention to provide a new and improved inertia brake arrangement for a push type clutch.

More specifically, it is an object of this invention to provide an inertia brake arrangement of the type described wherein the motion of the clutch releasing yoke is reversed and utilized to effect the braking action and wherein the mechanism is provided with a simple adjustment to compensate for wear in the clutch mechanism.

The invention consists in the novel features and in the combinations and constructions hereinafter set forth and claimed.

In describing this invention, reference is had to the accompanying drawings in which like characters designate corresponding parts in all the views.

In the drawings—

FIGURE 1 is a fragmentary cross sectional view of the preferred embodiment of the invention with the braking mechanism shown in the disengaged position.

FIGURE 2 is an elevational view similar to FIGURE 1 with the braking arrangement shown in the engaged position.

FIGURE 3 is a view taken looking in the direction of the arrows of line 3—3 on FIGURE 1.

Figure 4:
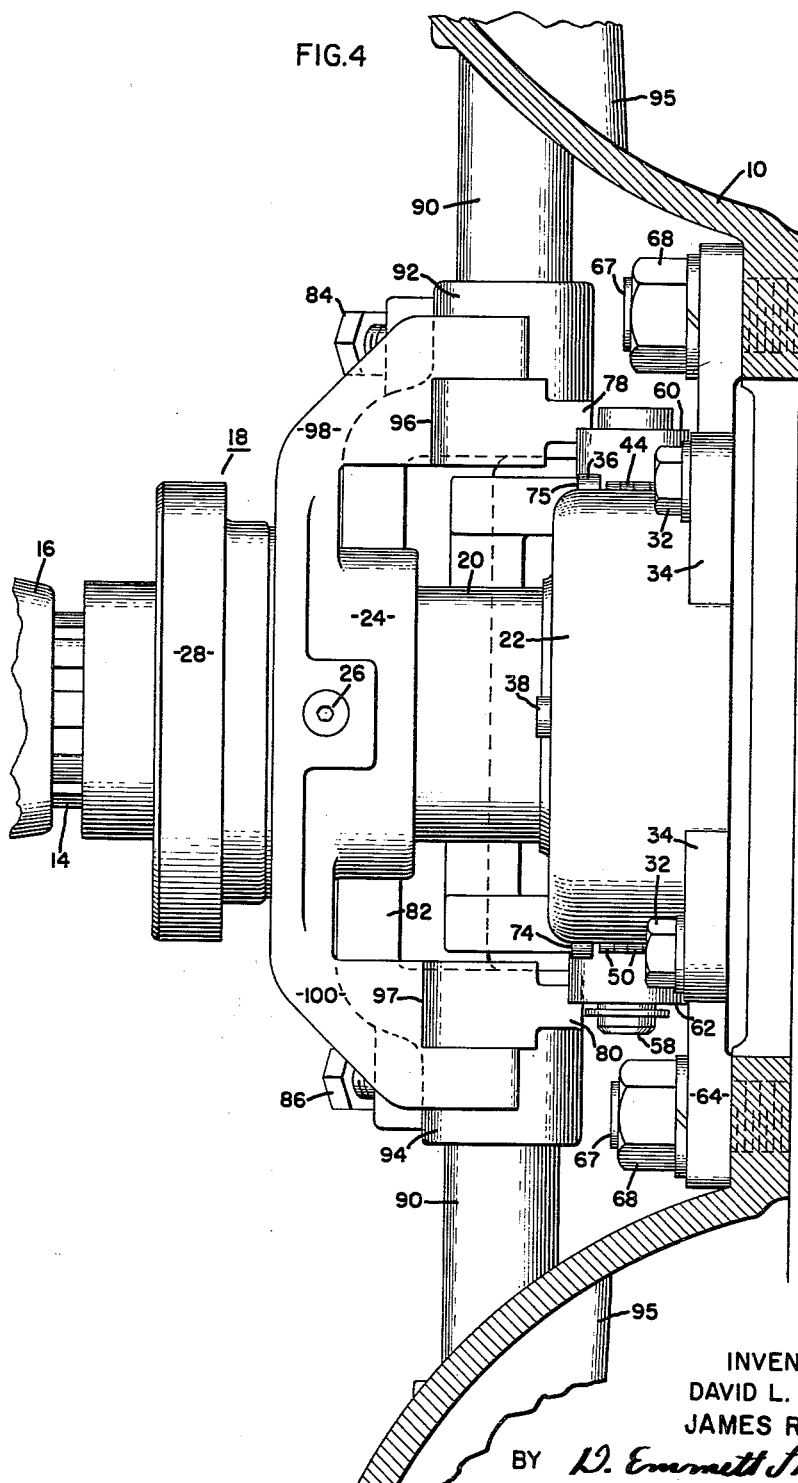
FIGURE 4 is a view taken looking in the direction of the arrows of line 4—4 on FIGURE 3.

In FIGURES 1 and 2 a portion of a conventional push type clutch of the normally engaged single or multiple disc type having a plurality of release levers and driving and driven members has been shown in a conventional bell housing 10. A portion of one of the release levers 12 is shown and the driven member which is shown as shaft 14 shows a portion of the hub 16 of one of the friction discs mounted thereon. A clutch throw-out member, generally indicated by the reference numeral 18, is shown as being slidably mounted on the sleeve portion 20 of a brake and drive shaft cap member generally indicated at 21 which terminates at its rearward end in a hub portion 22. As seen in FIGURE 1, there is a clearance space between the driven shaft 14 and the inner diameter of the sleeve 20 so that the shaft 14 rotates freely within the sleeve 20 without any frictional engagement therebetween.

Clutch throw-out member 18 consists of bearing carrier 24 having a conventional oil fitting aperture 26 and a thrust bearing 28, which serves to engage the release members 12 when the member 18 is moved to the left to disengage the clutch in the conventional manner. As will be obvious, the throw-out member 18 is mounted for slidable movement on the sleeve 20.

The flange portion 22 of member 21 is mounted on a front bearing cover 30 by means of a plurality of bolts 32, seen to be four in number in FIGURE 3, which are received in fingers 34 formed to extend outwardly from the hub portion 22. The bolts 32 also pass through apertures formed in the bearing cover 30 and serve to affix both the member 21 and the cover 30 to the front of a conventional vehicle transmission housing (not shown).

The braking mechanism consists of a pressure plate 36 which is received in the flange 22 and is provided with a pair of pins 38 and 40 which serve to prevent any rotary movement of the pressure plate 36 within the flange 22 and also guide the axial movement of the pressure plate 36. Positioned intermediate the rearward face of the pressure plate 36 and a braking face 42 formed on the bearing cover 30 is a brake disc 44 having a pair of keys 46 received in a pair of axially extending keyways 48 formed on the driven shaft 14. The brake disc 44 is provided on each of its faces with an annular friction facing 50 whereby when the pressure plate is moved rearwardly, the friction faces will be gripped between the pressure plate 36 and the brake face 42 on the cover 30 to halt the rotation of the brake disc 44 and in turn, the rotation of the driven shaft 14 to permit rapid and easy "up shifting" from one transmission speed to another by the operator of the vehicle.

Movement of the brake pressure plate 36 is effected by a brake yoke member 56 which is pivotally mounted at its lower end on a pin 58 carried between a pair of bosses 60, 62 formed on a plate 64 which is affixed to the wall 66 of the transmission housing by a pair of bolts 67 and nuts 68. The yoke member 56 extends upwardly and is formed with a pair of yoke arms 70 and 72, which terminate in a pair of pressure faces 74, 75, shown in the dashed line in FIGURES 1 and 2. As best seen in FIGURE 3, the flange 22 of the member 21 is relieved at its sides so as to permit the pressure faces 74 and 75 to engage the peripheral portions of the pressure plate 36. Accordingly, when the yoke 56 is oscillated in a clockwise direction, as viewed in FIGURES 1 and 2, and as shown in FIGURE 2, the pressure plate 36 will be urged toward the brake disc 44 to brake the driven shaft 14, as previously described.

The brake yoke 56 is caused to be oscillated by means of the clutch yoke 76. The clutch yoke 76 is formed with a pair of upstanding arms 78 and 80 and a bight portion 82. The clutch yoke 76 is mounted by means of a pair of set screws or bolts 84, and 86, on a split shaft 90, which is received in hub portions 92 and 94 formed on the clutch yoke 76. The split shaft 90 is journalled in bosses 95 formed in the bell housing 10 in the conventional manner and extends outwardly of the bell housing and is connected to the clutch pedal linkage in the old and well known manner.

The arms 78 and 80 are formed with pressure surfaces 96 and 97, indicated in dashed lines in FIGURES 1 and 2, and these surfaces serve to engage complementary positioned pressure surfaces formed on the arms 98 and 100 which extend outwardly from and are formed on the bearing carrier 24. The bight portion 82 of the clutch yoke 76 is provided intermediate its ends with a brake yoke actuating member which may take the form, as shown in the drawings, of a bolt 104 received in a threaded aperture formed in the bight portion 82. The bolt 104 is adjusted so as to cause the brake yoke 56 to be oscillated in a clockwise direction when the clutch yoke 76 is oscillated in a counter-clockwise direction, as viewed in FIGURES 1 and 2, whereby oscillation of the clutch yoke serves to disengage the clutch and will cause the brake arrangement to be actuated. The bolt 104 is locked in its adjusted position by means of a lock nut 106, and as will be obvious, the bolt 104 may be easily adjusted to compensate for clutch wear.

As will be obvious, the clutch brake shown and described is a simple yet reliable arrangement which utilizes the motion of the clutch yoke to actuate the brake but yet permits simple adjustment to compensate for clutch wear.

What we claim is:

1. An inertia brake arrangement for braking the driven member of a push clutch upon disengagement of a driving connection through said clutch to said driven member comprising a fixed sleeve surrounding said driven member, a clutch throw-out member mounted on said sleeve, a yoke member having a bight portion and a pair of legs, a split shaft journalled for oscillation in proximity to said clutch throw-out member, said yoke member being mounted on said split shaft for oscillation therewith, the legs of said yoke member engaging said throw-out member, means for oscillating said split shaft and yoke member to move said throw-out member in a first direction on said sleeve, said movement causing disengagement of said driving connection to said driven member, a second yoke member positioned to be engaged by said first yoke member, said second yoke member being pivotally mounted for movement in the opposite direction to the movement of said first yoke member when engaged by said first yoke member and means operable upon said movement of said second yoke member to brake said driven member after disengagement of the driving connection through said clutch to said driven member.

2. The inertia brake of claim 1, wherein said sleeve includes a flange portion, a brake pressure plate received in said flange portion, means cooperable between said pressure plate and said flange portion to guide movement of said pressure plate, said pressure plate being positioned for engagement by said second yoke member to move said pressure plate rearwardly along said driven member whereby to brake the rotation of said driven member.

References Cited in the file of this patent

UNITED STATES PATENTS

| | | |
|---|---|---|
| 2,266,581 | Baker et al. | Dec. 16, 1941 |
| 2,511,133 | Spase | June 13, 1950 |
| 2,590,089 | Cook | Mar. 25, 1952 |